US012240453B2

(12) United States Patent
Lewandowski et al.

(10) Patent No.: US 12,240,453 B2
(45) Date of Patent: Mar. 4, 2025

(54) ACTIVATING ADAPTIVE CRUISE CONTROL

(71) Applicant: Ford Global Technologies, LLC, Dearborn, MI (US)

(72) Inventors: Andrew Denis Lewandowski, Sterling Heights, MI (US); Jordan Barrett, Milford, MI (US); Brendan Francis Diamond, Grosse Pointe, MI (US); Keith Weston, Canton, MI (US); Anthony Maraldo, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 17/746,171

(22) Filed: May 17, 2022

(65) Prior Publication Data
US 2023/0373478 A1   Nov. 23, 2023

(51) Int. Cl.
*B60W 30/14* (2006.01)
*G01C 21/34* (2006.01)

(52) U.S. Cl.
CPC ....... *B60W 30/143* (2013.01); *G01C 21/3492* (2013.01); *B60W 2555/60* (2020.02)

(58) Field of Classification Search
CPC ........... B60W 30/143; B60W 2555/60; B60W 50/14; G01C 21/3492; G01C 21/3697
USPC ........................................................ 701/93
See application file for complete search history.

(56) References Cited

U.S. PATENT DOCUMENTS

| | | | |
|---|---|---|---|
| 6,622,087 B2 | 9/2003 | Anderson | |
| 7,774,121 B2 | 8/2010 | Lee et al. | |
| 9,389,089 B2 | 7/2016 | Wingrove et al. | |
| 10,309,791 B2 | 6/2019 | Rajab et al. | |
| 2014/0303839 A1* | 10/2014 | Filev | G06F 3/0481 701/36 |
| 2016/0069693 A1* | 3/2016 | Wingrove | G01C 21/3484 701/468 |
| 2016/0076902 A1* | 3/2016 | Diaz | G01C 21/26 701/408 |
| 2016/0167570 A1* | 6/2016 | Raubvogel | G01S 19/42 701/408 |
| 2018/0319402 A1* | 11/2018 | Mills | B60W 10/04 |
| 2019/0049259 A1* | 2/2019 | Galan-Oliveras | G01C 21/3407 |
| 2019/0301877 A1* | 10/2019 | Duale | G01C 21/3484 |
| 2021/0009160 A1 | 1/2021 | Hauser et al. | |
| 2021/0389144 A1* | 12/2021 | Kim | G06F 16/29 |
| 2022/0250543 A1* | 8/2022 | Szczerba | B60W 30/143 |

* cited by examiner

*Primary Examiner* — Tiffany P Young
*Assistant Examiner* — Ashleigh Nicole Turnbaugh
(74) *Attorney, Agent, or Firm* — Frank A. MacKenzie; Brooks Kushman P.C.

(57) ABSTRACT

A computer is programmed to, in response to a navigation feature being active for a route, prompt an operator of the vehicle to activate a driver-assist feature of the vehicle. For example, the computer can output a message via a user interface indicating that the driver-assist feature is available to be used. The computer is further programmed to receive an input indicating a destination, determine the route for the vehicle from a current location of the vehicle to the destination, and activate the navigation feature to output guidance instructing the operator to follow the route.

14 Claims, 4 Drawing Sheets

ACTIVATING ADAPTIVE CRUISE CONTROL

BACKGROUND

Some vehicles are equipped with driver-assist features such as adaptive cruise control. Cruise control maintains a vehicle at a set speed without an operator providing input through an accelerator pedal. Adaptive cruise control is cruise control that lowers the speed of the vehicle when a slower-moving vehicle is ahead of the vehicle in order to maintain a distance from the slower-moving vehicle. Adaptive cruise control can also raise the speed of the vehicle back to the set speed when the slower-moving vehicle is no longer ahead of the vehicle.

DETAILED DESCRIPTION

Figure 1:
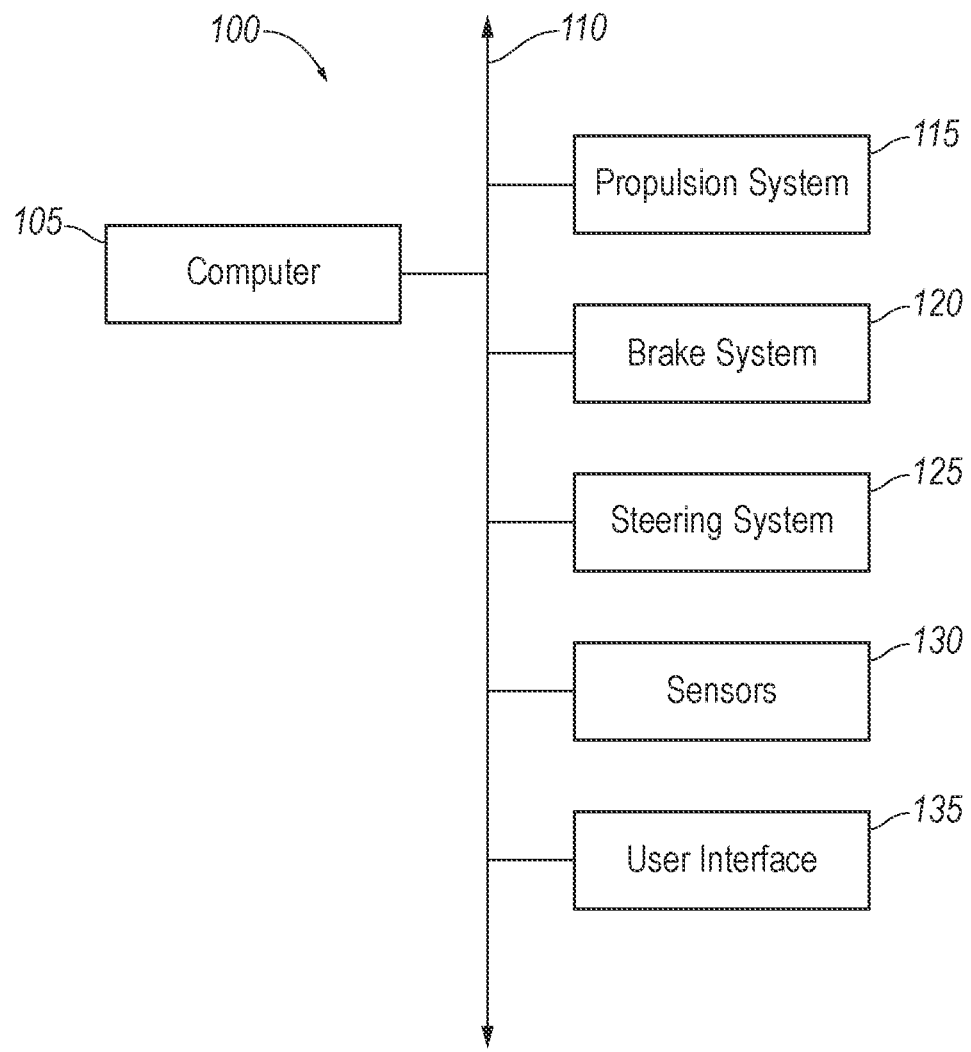
FIG. 1 is a block diagram of an example vehicle.

This disclosure relates to techniques for implementing a driver-assist feature, e.g., adaptive cruise control, on a vehicle. The driver-assist feature described herein can slow the vehicle from a set speed when the vehicle is approaching situations in which the vehicle will generally travel at a slower speed, such as curves, turns, freeway exits, decreases in the posted speed limit, etc. The driver-assist feature can be notified of such situations, e.g., by map data indicating curves, posted speed limits, intersections, etc.; and/or by navigation data indicating what path the vehicle is expected to follow at intersections, freeway exits, etc.

The disclosure also relates to a computer programmed with techniques to learn preferred routes by an operator so that the driver-assist feature can operate with fewer unintended slowdowns. If the operator deviates from a route provided by a navigation system with the driver-assist feature active, the driver-assist feature may slow the vehicle for expected turns that the operator does not perform. Because of those slowdowns, the operator may deactivate the driver-assist feature. Once the computer detects a preferred route to a destination, the computer can prompt the operator to activate the driver-assist feature, now that the driver-assist feature will operate with fewer of the slowdowns that caused the operator to deactivate the driver-assist feature.

A computer includes a processor and a memory, and the memory stores instructions executable by the processor to receive an input indicating a destination; determine a route for a vehicle from a current location of the vehicle to the destination; activate a navigation feature to output guidance instructing an operator to follow the route; and in response to the navigation feature being active for the route, prompt the operator to activate a driver-assist feature of the vehicle.

The driver-assist feature may include an adaptive cruise control.

Prompting the operator to activate the driver-assist feature may be conditional on a criterion being satisfied. The criterion may be based on previous usage of the driver-assist feature.

The instructions may further include instructions to track a usage count of the vehicle following the route to the destination, and the criterion may be based on the usage count. The criterion may include that the usage count weighted by a gain exceeds a threshold. The gain may depend on previous usage of the driver-assist feature.

The instructions may further include instructions to receive data indicating a condition affecting the vehicle, and the usage count may be a number of times the vehicle followed the route when the condition affected the vehicle.

The route may be a first route, and the criterion may be based on previously deviating onto the first route while the navigation feature was active for a second route.

The instructions may further include instructions to receive data indicating a condition affecting the vehicle, determining the route may be based on the condition, and the route may be different than an alternative route that would be determined if the condition were not present. The condition may be that the vehicle is carrying a load.

The condition may be a weather condition.

The instructions may further include instructions to track a usage count for the route, and in response to the usage count exceeding a threshold, output a prompt to the operator to save the route to memory. Determining the route may include to select the route from a plurality of saved routes in memory, and the route may be different than an alternative route that would be determined if the route were not saved to memory. The instructions may further include instructions to receive data indicating a condition affecting the vehicle, the route may be associated with the condition, and determining the route may be based on the condition being present.

The route may be a first route, the destination may be a first destination, determining the first route may include to select a second route from a plurality of saved routes in memory, the second route may be to a second destination that is between the current location and the first destination, and the first route may be different than an alternative route that would be determined if the second route were not saved to memory.

The input may be a first input, the route may be a first route, and the instructions may further include instructions to, in response to a second input, save a second route along which the vehicle travels to memory.

The instructions may further include instructions to, while the navigation feature is active, in response to approaching a turn in the route while the driver-assist feature is active, slow the vehicle below a target speed of the driver-assist feature. The target speed may be a posted speed limit.

A method includes receiving an input indicating a destination; determining a route for a vehicle from a current location of the vehicle to the destination; activating a navigation feature to output guidance instructing an operator to follow the route; and in response to the navigation feature being active for the route, prompting the operator to activate a driver-assist feature of the vehicle.

With reference to the Figures, wherein like numerals indicate like parts throughout the several views, a computer 105 includes a processor and a memory, and the memory stores instructions executable by the processor to receive an input indicating a destination 300; determine a route 200 for a vehicle 100 from a current location 305 of the vehicle 100 to the destination 300; activate a navigation feature to output guidance instructing an operator to follow the route 200; and, in response to the navigation feature being active for the route 200, prompt the operator to activate a driver-assist feature of the vehicle 100.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. The computer 105 can be programmed to operate the vehicle 100 independently of the intervention of a human operator, completely or to a lesser degree. The computer 105 may be programmed to operate a propulsion system 115, a brake system 120, a steering system 125, and/or other vehicle systems based on data received from sensors 130. For the purposes of this disclosure, autonomous operation means the computer 105 controls the propulsion system 115, brake system 120, and steering system 125 without input from a human operator; semi-autonomous operation means the computer 105 controls one or two of the propulsion system 115, brake system 120, and steering system 125 and a human operator controls the remainder; and nonautonomous operation means a human operator controls the propulsion system 115, brake system 120, and steering system 125. The driver-assist feature can be autonomous or semi-autonomous.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 110 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the propulsion system 115, the brake system 120, the steering system 125, the sensors 130, a user interface 135, and other components via the communications network 110.

The propulsion system 115 of the vehicle 100 generates energy and translates the energy into motion of the vehicle 100. The propulsion system 115 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 115 can include an electronic control unit (ECU) or the like that is in communication with and receives input from the computer 105 and/or a human operator. The human operator may control the propulsion system 115 via, e.g., an accelerator pedal and/or a gear-shift lever.

The brake system 120 is typically a conventional vehicle braking subsystem and resists the motion of the vehicle 100 to thereby slow and/or stop the vehicle 100. The brake system 120 may include friction brakes such as disc brakes, drum brakes, band brakes, etc.; regenerative brakes; any other suitable type of brakes; or a combination. The brake system 120 can include an electronic control unit (ECU) or the like that is in communication with and receives input from the computer 105 and/or a human operator. The human operator may control the brake system 120 via, e.g., a brake pedal.

The steering system 125 is typically a conventional vehicle steering subsystem and controls the turning of the wheels. The steering system 125 may be a rack-and-pinion system with electric power-assisted steering, a steer-by-wire system, as both are known, or any other suitable system. The steering system 125 can include an electronic control unit (ECU) or the like that is in communication with and receives input from the computer 105 and/or a human operator. The human operator may control the steering system 125 via, e.g., a steering wheel.

The sensors 130 may provide data about operation of the vehicle 100, for example, wheel speed, wheel orientation, and engine and transmission data (e.g., temperature, fuel consumption, etc.). The sensors 130 may detect the location and/or orientation of the vehicle 100. For example, the sensors 130 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 130 may detect the external world, e.g., objects and/or characteristics of surroundings of the vehicle 100, such as other vehicles, road lane markings, traffic lights and/or signs, pedestrians, etc. For example, the sensors 130 may include radar sensors, ultrasonic sensors, scanning laser range finders, light detection and ranging (LIDAR) devices, and image processing sensors such as cameras.

The user interface 135 presents information to and receives information from an operator of the vehicle 100. The user interface 135 may be located, e.g., on an instrument panel in a passenger cabin of the vehicle 100, or wherever may be readily seen by the operator. The user interface 135 may include dials, digital readouts, screens, speakers, and so on for providing information to the operator, e.g., human-machine interface (HMI) elements such as are known. The user interface 135 may include buttons, knobs, keypads, microphone, and so on for receiving information from the operator.

Figure 2:
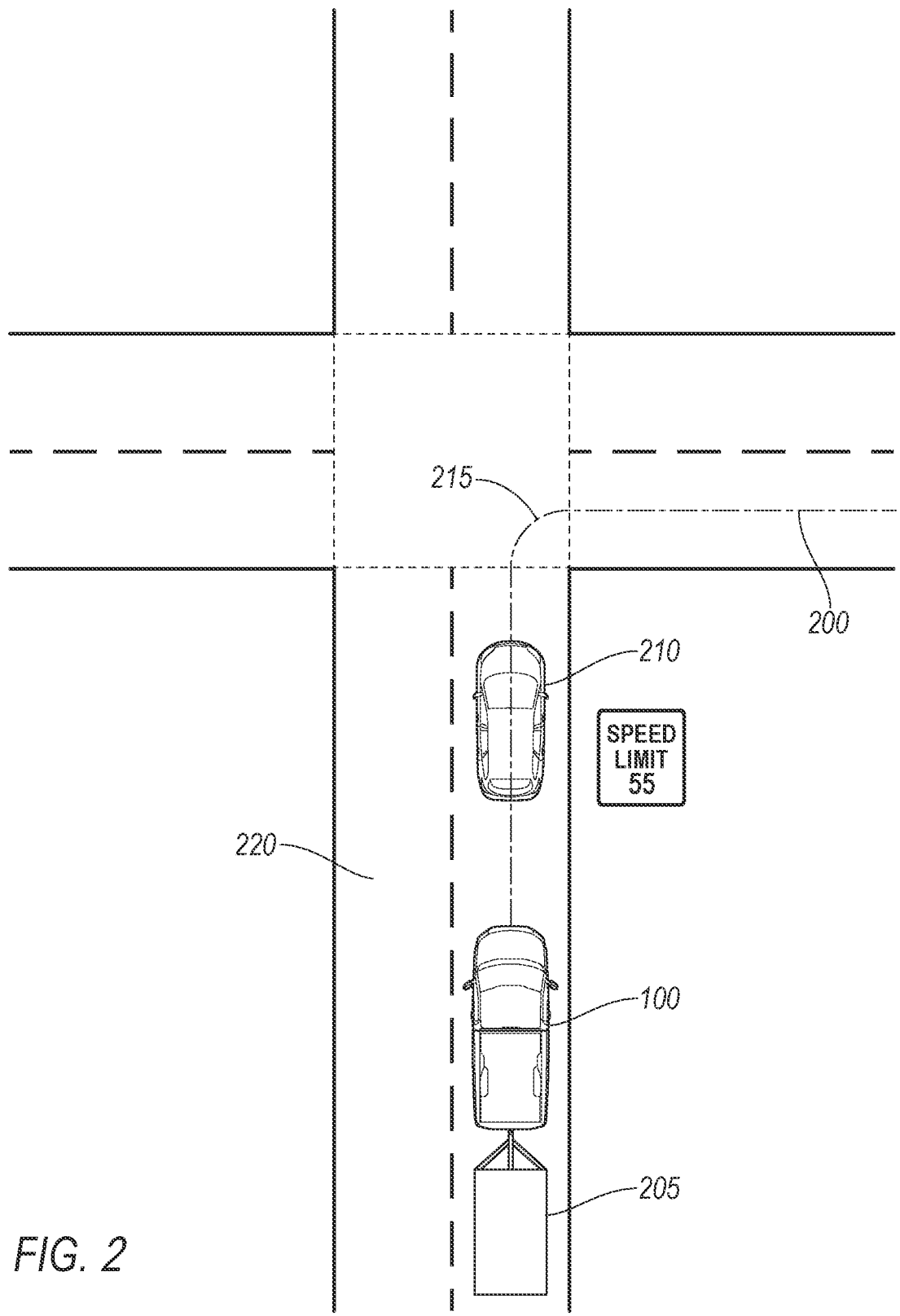
FIG. 2 is a top diagrammatic view of the vehicle traveling behind a leading vehicle.

With reference to FIG. 2, the computer 105 can be programmed to receive data indicating a condition affecting the vehicle 100. For the purposes of this disclosure, a "condition affecting a vehicle" is defined as circumstances currently applying to the vehicle 100 that change the driving behavior of the vehicle 100. For example, the condition can be that the vehicle 100 is carrying a load 205 or that a weather condition is present. The load 205 can increase a momentum of the vehicle 100, affecting at least acceleration and braking. A weather condition such as precipitation can change a stopping distance of the vehicle 100. For another example, traffic density does not qualify as a condition affecting the vehicle 100 because the vehicle 100 operates the same regardless of the number of other vehicles in the vicinity.

The condition can be that the vehicle 100 is carrying a load 205. For example, the load 205 can include cargo placed in the vehicle 100, e.g., in a bed of the vehicle 100. For another example, the load 205 can include a trailer towed by the vehicle 100. The trailer can be an unpowered vehicle outfitted to be towed by the vehicle 100. The trailer can be unpowered by lacking a propulsion or can be temporarily unpowered, e.g., by being in a neutral gear. The trailer can be used to transport goods, provide living space, etc. The trailer can be hitched to the vehicle 100. For example, the vehicle 100 and the trailer can be connected by a tow hitch, also referred to as a trailer hitch. The tow hitch can be any suitable type, e.g., a tow ball and socket, a fifth wheel and gooseneck, etc.

The computer 105 can be programmed to determine that the vehicle 100 is carrying the load 205 and to determine an amount of the load 205. The amount can be a weight. For example, if the load 205 is cargo placed in the vehicle 100, the computer 105 can receive data indicating a weight of the load 205 from the sensors 130, e.g., from a weight sensor for the bed, e.g., that is part of the suspension system. For another example, the computer 105 can receive data from, e.g., the propulsion system 115, indicating an acceleration resulting in a given speed, from which a weight of the load 205 can be inferred. For another example, the weight of the load 205 can be inputted by an operator of the vehicle 100 into the user interface 135, e.g., after using a weigh station.

The condition can be a weather condition, e.g., precipitation. The computer 105 can be programmed to determine the weather condition. For example, the computer 105 can receive weather data from a remote server. For another example, the sensors 130 can include a precipitation sensor. The precipitation sensor can be any sensor suitable to detect precipitation. For example, the precipitation sensor may be a piezoelectric sensor coupled to the windshield to detect vibrations from, e.g., precipitation. Vibration data such as amplitude and frequency may be associated with, e.g., types of precipitation such as rain or hail. Alternatively, the precipitation sensor may be positioned where water from rain will pool and configured to detect such water. For example, the precipitation sensor may include two electrical leads that, when connected, close a circuit; when water is present between the leads, the conductivity of water changes to allow current to flow through the circuit where previously it would not have done so, or changes how much current is flowing by a known amount. For another example, the precipitation sensor may include an LED bulb, a light sensor, and possibly a prism reflecting light from the LED bulb to the light sensor; the presence of water scatters some of the light, reducing the light received by the light sensor by a known amount.

A driver-assist feature includes an algorithm stored on the computer 105 that operates at least one of the propulsion system 115, brake system 120, and steering system 125 without intervention from the human operator. For example, the driver-assist feature can include adaptive cruise control, lane-keeping assist, automatic lane change, automatic turning, etc., or a combination of the foregoing. The adaptive cruise control is described in more detail as a primary example below. The lane-keeping assist can actuate the steering system 125 to keep the vehicle 100 centered within a lane of travel based on data from the sensors 130 indicating positions of lane markers. The automatic lane change can, upon receiving an input from the operator and determining based on data from the sensors 130 that an adjacent lane to the lane of travel is unobstructed, actuate the steering system 125 to turn to merge the vehicle 100 into the adjacent lane and then to straighten the path of the vehicle 100 within the new lane. The automatic turning can, upon receiving an input from the operator, actuate the steering system 125 to turn the vehicle 100 at an intersection.

The computer 105 can be programmed to activate the driver-assist feature, i.e., to begin actuating the propulsion system 115, the brake system 120, and/or the steering system 125 according to the algorithm, in response to receiving an input to activate the driver-assist feature from the operator, e.g., via the user interface 135. The computer 105 can be programmed to deactivate the driver-assist feature, i.e., to cease actuating the propulsion system 115, the brake system 120, and/or the steering system 125 according to the algorithm, in response to receiving an input to deactivate the driver-assist feature from the operator, e.g., via the user interface 135 or via pressing the brake pedal. The computer 105 can lack programming to activate or deactivate the driver-assist feature other than in response to inputs from the operator. Ultimate control over whether the driver-assist feature is active can rest with the operator.

The computer 105 can be programmed to operate the driver-assist feature, i.e., to actuate the propulsion system 115, the brake system 120, and/or the steering system 125 according to the algorithm stored on the computer 105. For example, operating the adaptive cruise control includes actuating the propulsion system 115 and the brake system 120 according to an adaptive-cruise-control algorithm stored on the computer 105. The computer 105 can be programmed to operate the driver-assist feature according to parameters of the driver-assist feature, for which parameters of the adaptive cruise control will be used as examples. For example, the parameters of the adaptive cruise control can include a target speed and a following distance. The computer 105 can be programmed to, according to the adaptive cruise control, actuate the propulsion system 115 and/or the brake system 120 to maintain a speed of the vehicle 100 at the target speed and to accelerate up to the target speed. The computer 105 can be programmed to, according to the adaptive cruise control, vary the speed to maintain a distance from a leading vehicle 210 back to the vehicle 100 at the following distance when the leading vehicle 210 is traveling below the target speed. The following distance can be a function of the speed and/or of the target speed.

The parameters of the adaptive cruise control can include the target speed, the following distance, a rate of acceleration up to the target speed, a time relative to a change in a posted speed limit to start accelerating the vehicle 100, a time relative to a turn 215 to start decelerating the vehicle 100 from a target speed into the turn 215, a time relative to the turn 215 to start accelerating the vehicle 100 to the target speed out of the turn 215, a target turn speed for the turn 215, and/or others, as will be described below. The parameters can be set by the operator when activating or using the adaptive cruise control, can be stored in memory, and/or can be determined based on data received by the computer 105 according to formulas stored in memory. The computer 105 can be programmed to operate the adaptive cruise control based on the route 200 of the vehicle 100. For example, some of the parameters can control operation relative to a turn 215 or a change in the posted speed limit, as will be described below.

The parameters can include the target speed. The computer 105 can be programmed to, according to the adaptive cruise control, actuate the propulsion system 115 and/or the brake system 120 to maintain a speed of the vehicle 100 at the target speed and to accelerate up to the target speed. The target speed can be an input from the operator. Alternatively or additionally, the computer 105 can determine the target speed from the posted speed limit, e.g., by setting the target speed to the posted speed limit. For example, the operator can select to input the target speed or to set the target speed to the posted speed limit. The computer 105 can determine the posted speed limit from map data that specifies the speed limits along segments of road 220 and from location data from the GPS sensor specifying which segment the vehicle 100 is on, and/or the computer 105 can determine the posted speed limit by applying text recognition to camera data showing a sign stating the posted speed limit.

The parameters can include a following distance between the vehicle 100 and the leading vehicle 210 in front of the vehicle 100. The computer 105 can be programmed to, according to the adaptive cruise control, vary the speed to maintain a distance from the leading vehicle 210 back to the vehicle 100 at the following distance when the leading vehicle 210 is traveling below the target speed. The following distance can be a function of the speed and/or of the target speed.

The parameters can include a target turn speed for turns 215. The computer 105 can be programmed to, in response to approaching a turn 215 in the route 200 while the adaptive cruise control is active, slow the vehicle 100 below the target speed to the target turn speed. The computer 105 can be programmed to determine the target turn speed based on the load 205, e.g., the amount of the load 205; the radius of the turn 215; and/or the posted speed limit, which may be different for the turn 215 than for the rest of the road 220. The target turn speed can be slower for larger loads 205, smaller radii, and lower posted speed limits. For example, the computer 105 can store a lookup table providing the target turn speed. The values for the lookup table can be chosen based on what speeds will ensure a stable turn 215 without skidding or tipping. For another example, the computer 105 can store a maximum lateral acceleration and calculate the target turn speed that ensures that the vehicle will not exceed the maximum lateral acceleration based on the radius of the turn 215, e.g., $v=\sqrt{ar}$, in which v is the speed, a is the maximum lateral acceleration, and r is the radius of the turn 215. The maximum lateral acceleration can vary based on the amount of the load 205, e.g., as a function of the combined weight of the vehicle 100 and the load 205. The speed according to the lookup table or the calculation can then be capped at the posted speed limit for the turn 215 if the posted speed limit is lower.

The parameters can include times to begin accelerating relative to a change in the route 200, e.g., a time relative to a change in the posted speed limit to start (positively or negatively) accelerating the vehicle 100 from an old target speed to a new target speed, a time relative to a turn 215 to start decelerating the vehicle 100 from the target speed into the turn 215 to the target turn speed, a time relative to the turn 215 to start positively accelerating the vehicle 100 from the target turn speed to the target speed out of the turn 215, a time relative to a change in grade to start accelerating or decelerating the vehicle 100 from the target speed (e.g., decelerating via engine braking), etc. The time relative to the change can be an amount of time before or after the vehicle 100 encounters the change, e.g., ten seconds before the change, two seconds after the change, etc. The computer 105 can be programmed to, according to the adaptive cruise control, determine the time at which the vehicle 100 will encounter the change based on the speed and the route 200 and to actuate the propulsion system 115 and/or the brake system 120 to accelerate or decelerate the vehicle 100 starting at the time relative to the change. The computer 105 can store the times in memory.

Figure 3:
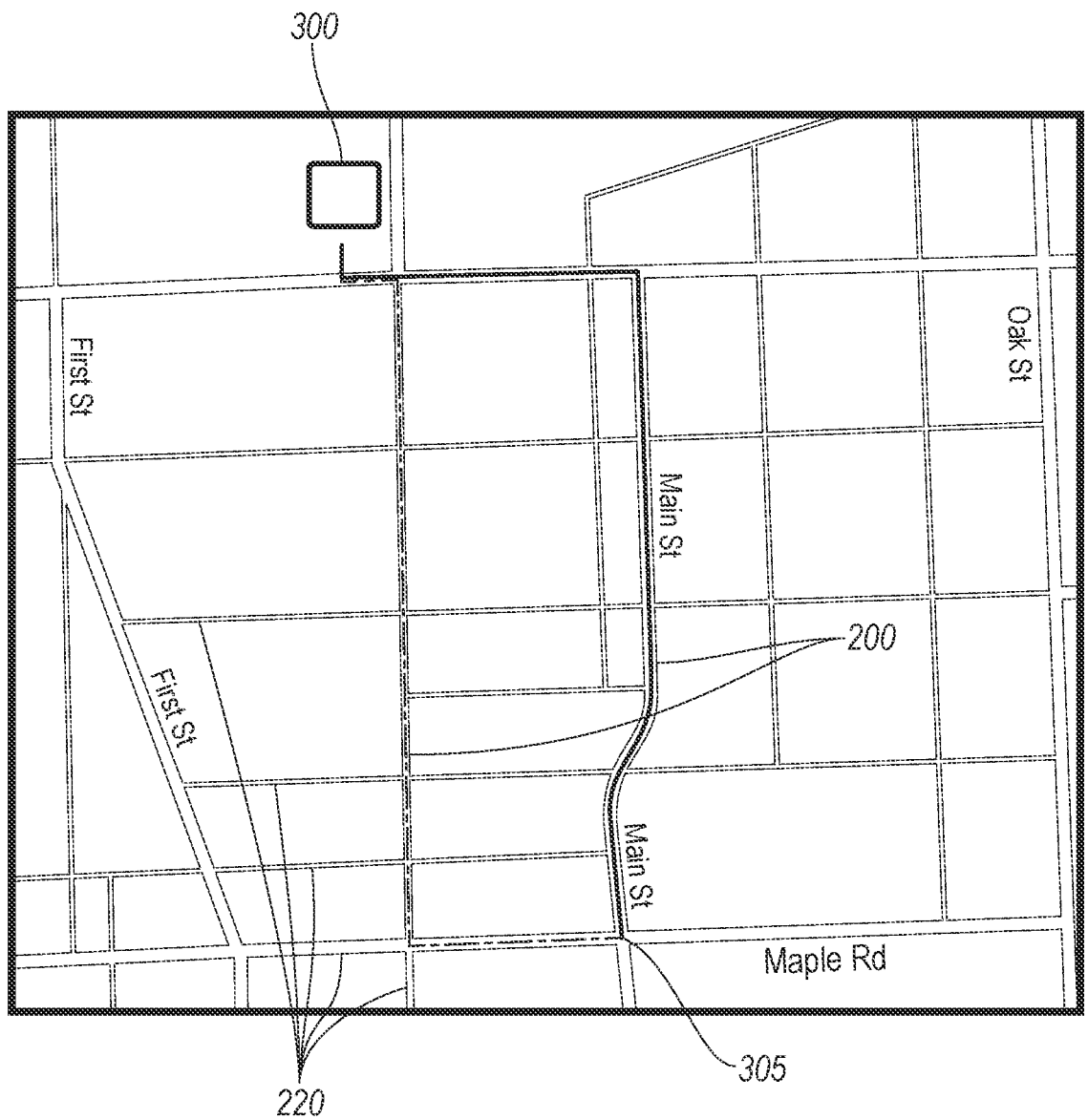
FIG. 3 is a map showing example alternative routes to a destination.

With reference to FIG. 3, the computer 105 can be programmed to track one or more usage counts of the vehicle 100 following a particular route 200 to a particular destination 300. A usage count is a number of times the vehicle 100 followed the route 200. The computer 105 can track separate usage counts for different conditions affecting the vehicle 100, e.g., a first usage count of a number of times following a particular route 200 while rain is present, a second usage count of a number of times following the route 200 while the vehicle 100 is carrying the load 205, a third usage count of a number of times following the route 200 with no precipitation and no load 205. The computer 105 can increment one of the usage counts in response to the vehicle 100 arriving at the destination 300 after following the route 200 with the relevant condition or lack of conditions detected. The computer 105 can track the usage counts regardless of whether the navigation feature is active.

The computer 105 can be programmed to, in response to one of the usage counts exceeding a threshold, output a prompt to an operator to save the route 200 to memory, e.g., as a predefined route 200 available in the navigation feature, via the user interface 135. The threshold can be chosen to indicate regular usage of the route 200, e.g., three. The computer 105 can save the route 200 to memory in response to an input from the operator via the user interface 135 to do so.

The computer 105 can be programmed to, in response to an input, save a route 200 along which the vehicle 100 travels to memory, e.g., as a predefined route 200 available in the navigation feature. For example, the computer 105 can receive the input from the operator via the user interface 135 indicating to begin recording the route 200. The computer 105 can record the route 200, e.g., as segments between intersections, as the vehicle 100 travels along the route 200, beginning at a current location 305 of the vehicle 100. The computer 105 can save the completed route 200 upon the vehicle 100 reaching the destination 300, as indicated by, e.g., putting the propulsion system 115 into park or turning off the vehicle 100.

The computer 105 can be programmed to activate a navigation feature to determine a route 200 to a destination 300 and output guidance instructing an operator to follow the route 200. The computer 105 can activate the navigation feature in response to an input from the operator received via the user interface 135. The computer 105 can determine the route 200 as described below. The computer 105 can output the guidance via the user interface 135, e.g., as messages indicating a location of a next turn 215, as a map showing the route 200, etc.

The computer 105 can be programmed to determine the route 200 for the vehicle 100 from the current location 305 of the vehicle 100 to the destination 300 by performing a navigation algorithm. The computer 105 can receive an input, e.g., via the user interface 135, indicating the destination 300, and the computer 105 can receive the current location 305 from, e.g., a GPS sensor of the sensors 130. The computer 105 can perform the navigation algorithm upon determining that the computer 105 is not storing any routes 200 for the navigation feature, e.g., saved as described above. The navigation algorithm can be any suitable algorithm for generating the route 200 along a known network of roads 220, as are known. Determining the route 200 can be based on what conditions are affecting the vehicle 100. For example, the computer 105 can store preferences of the operator that are dependent on the presence or absence of the conditions, e.g., avoiding unprotected left turns when the vehicle 100 is carrying the load 205. The route 200 determined by the navigation algorithm can therefore be different when the condition is present, e.g., when the vehicle 100 is carrying the load 205, than the route 200 determined by the navigation algorithm when the condition is not present, e.g., when the vehicle 100 is not carrying the load 205.

The computer 105 can be programmed to determine the route 200 for the vehicle 100 from the current location 305 of the vehicle 100 to the destination 300 by selecting the route 200 from a plurality of the saved routes 200 in memory. The saved routes 200 can be saved as described above. The selected route 200 can be from the current location 305 to the inputted destination 300, or the selected route 200 can be to a different destination that is between the current location 305 and the inputted destination 300. In the latter scenario, the computer 105 can use a route 200 that includes the selected route to the different destination 300 and a second route from the different destination 300 to the inputted destination 300 that is generated by the navigation algorithm. In either case, the route 200 can be different than the route 200 that would have been determined by the navigation algorithm from the current location 305 to the destination 300, e.g., by following side streets rather than major roads 220. Determining the route 200 can be based on what conditions are affecting the vehicle 100. The selected route 200 can be associated with a condition that is affecting the vehicle 100. For example, the saved routes 200 can be sorted according to the conditions affecting the vehicle 100 being present or absent, and the computer 105 can select the route 200 according to which conditions are currently affecting the vehicle 100. For example, if the vehicle 100 is carrying the load 205, the computer 105 can select a saved route 200 associated with carrying the load 205.

The computer 105 can be programmed to, while the navigation feature is active, detect a deviation from the route 200. The computer 105 can compare location data, e.g., from the GPS sensor of the sensors 130, to map data of the route 200 to determine whether the location of the vehicle 100 is on any segment of the route 200. Upon detecting the deviation from the route 200, the computer 105 can determine a new route 200 from the current location 305 of the vehicle 100 to the original destination 300, in the manner described above.

The computer 105 can be programmed to, in response to the navigation feature being active for the route 200, prompt the operator to activate the driver-assist feature. For example, the computer 105 can output a message via the user interface 135 indicating that the driver-assist feature is available to be used. The message can include an option for the operator to select to activate the driver-assist feature. The message can include additional information, e.g., about the route 200. For example, the message can indicate that the navigation feature is using a route 200 selected from the saved routes 200, which may reassure the operator that the route 200 will conform to the operator's preferences and that the driver-assist feature, e.g., the adaptive cruise control, will only slow the vehicle 100 for the turns 215 that the operator intends to follow.

Prompting the operator to activate the driver-assist feature can be conditional on a criterion being satisfied. The criterion can be based on the usage count for the route 200, of the driver-assist feature, and/or previously deviating onto the route 200 while the navigation feature was active for a different route 200. A higher usage count for the route 200 can make the criterion more likely to be satisfied. Previously using the driver-assist feature while traveling the route 200 can make the criterion more likely to be satisfied than otherwise. Previously deviating onto the route 200 while the navigation feature was active for a different route 200 can make the criterion more likely to be satisfied than otherwise.

For example, the criterion can include that the usage count weighted by a gain exceeds a threshold. The gain and/or the threshold can depend on previous usage of the driver-assist feature and/or previous deviation onto the route 200 while the navigation feature was active for a different route 200. For example, the gain and the threshold can be chosen according to the applicable scenario from the following table.

| Scenario | Gain | Threshold |
| --- | --- | --- |
| Operator previously used driver-assist feature with navigation feature active and deviated from route. | 10 | 50 |
| Operator has not used driver-assist feature on this route and does not take other routes to the same destination. | 5 | 50 |
| Operator has not used driver-assist feature on this route and does not take other routes to a different destination that is between the current location and the inputted destination. | 3 | 45 |

The computer 105 can determine which scenario applies, multiply the gain for that scenario with the usage count for the route 200, and compare the resulting product with the threshold for that scenario. For example, if the operator has not used the driver-assist feature on the route 200 and does not take other routes to the same destination 300, and the usage count is 11, then the gain is 5 and the product is 55. If the product exceeds the threshold, the computer 105 can prompt the operator to activate the driver-assist feature. Continuing the example, the product of 55 is greater than the threshold of 50. The usage count that is used can depend on what conditions are affecting the vehicle 100, as described above. The gains and the thresholds can be calibrated based on feedback from test operators of vehicles 100.

Figure 4:
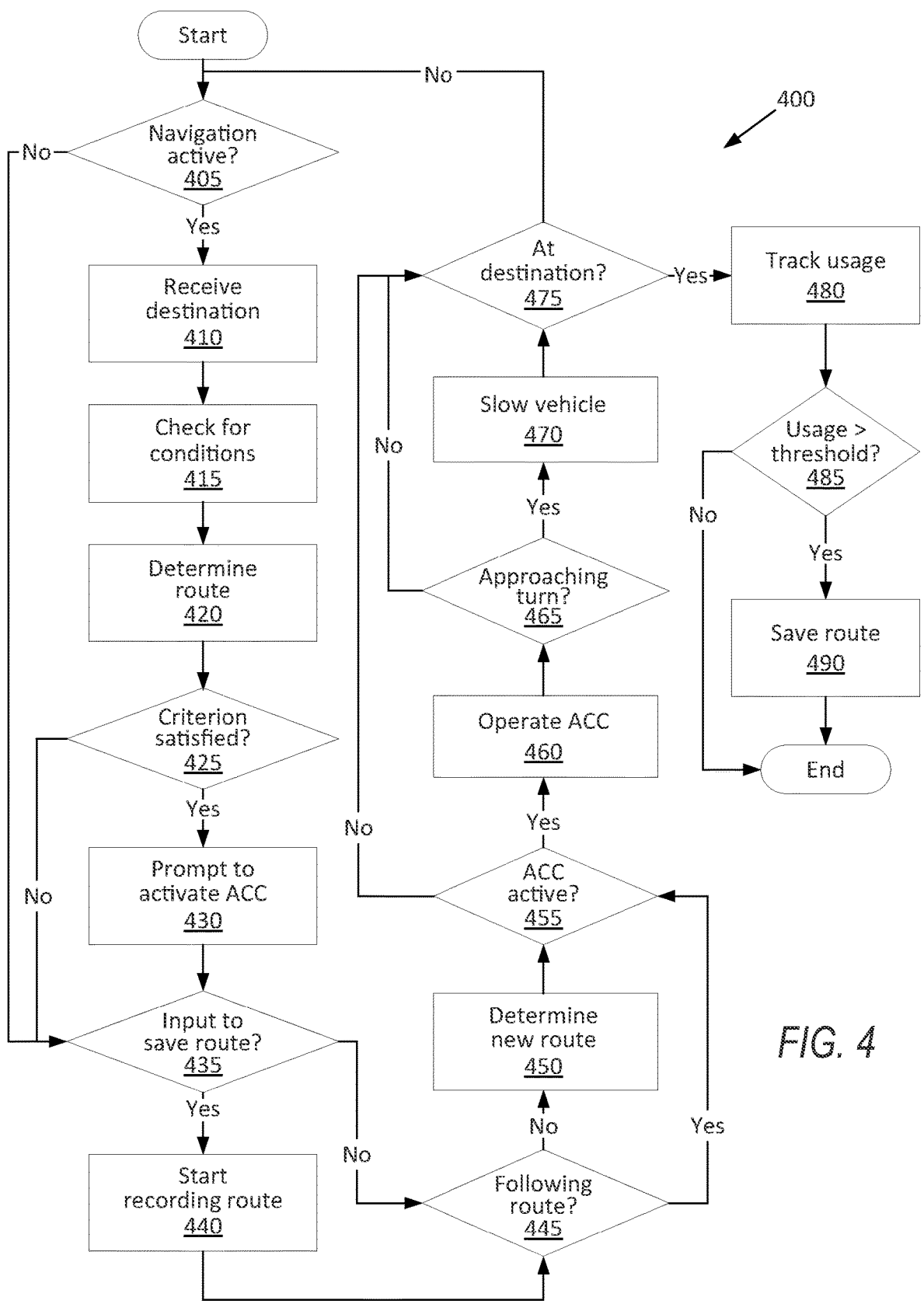
FIG. 4 is a process flow diagram of an example process for controlling activation of an adaptive cruise control of the vehicle.

FIG. 4 is a process flow diagram illustrating an exemplary process 400 for controlling activation of the driver-assist feature. The memory of the computer 105 stores executable instructions for performing the steps of the process 400 and/or programming can be implemented in structures such as mentioned above. As a general overview of the process 400, if the navigation feature is active, the computer 105 receives the destination 300, checks for conditions affecting the vehicle 100, determines the route 200, and, if the criterion is satisfied, prompts the operator to activate the driver-assist feature. Next, or if the navigation feature is inactive, the computer 105 starts recording the route 200 if an input was received to do so, and determines a new route 200 if the vehicle 100 deviates from the route 200. If the driver-assist feature is active, the computer 105 operates the vehicle 100 according to the parameters of the driver-assist feature, which includes slowing the vehicle 100 when approaching a turn 215. The foregoing continues until the vehicle 100 is at the destination 300. Once the vehicle 100 is at the destination 300, the computer 105 tracks the usage count and, if the usage counts exceeds a threshold, saves the route 200.

The process 400 begins in a decision block 405, in which the computer 105 determines whether the navigation feature is active. In response to the navigation feature being active, the process 400 proceeds to a block 410. In response to the navigation feature being inactive, the process 400 proceeds to a decision block 435.

In the block 410, the computer 105 receives an input indicating a destination 300, as described above.

Next, in a block 415, the computer 105 determines whether the computer 105 has received data indicating a condition affecting the vehicle 100, as described above.

Next, in a block 420, the computer 105 determines the route 200 from the current location 305 of the vehicle 100 to the destination 300 received in the block 410, as described above. The route 200 can depend on what, if any, conditions were detected in the block 415.

Next, in a decision block 425, the computer 105 determines whether the criterion is satisfied, as described above. If so, the process 400 proceeds to a block 430. If not, the process 400 proceeds to the decision block 435.

In the block 430, the computer 105 prompts the operator to activate the driver-assist feature, as described above. After the block 430, the process 400 proceeds to the decision block 435.

In the decision block 435, the computer 105 determines whether the computer 105 has received an input to save the route 200, as described above. If so, the process 400 proceeds to a block 440. If not, the process 400 proceeds to a decision block 445.

In the block 440, the computer 105 starts recording the route 200, as described above. After the block 440, the process 400 proceeds to the decision block 445.

In the decision block 445, the computer 105 determines whether the vehicle 100 has deviated from the route 200 determined by the navigation feature in the block 420. If the vehicle 100 has deviated from the route 200, the process 400 proceeds to a block 450. If the vehicle 100 is following the route 200 or if the navigation feature is inactive, the process 400 proceeds to a decision block 455.

In the block 450, the computer 105 determines a new route 200 to the destination 300, as described above. After the block 450, the process 400 proceeds to the decision block 455.

In the decision block 455, the computer 105 determines whether the driver-assist feature is active or inactive. The driver-assist feature can be activated or deactivated by an input from the operator, as described above. In response to the activation of the driver-assist feature or to the driver-assist feature already being active without a deactivation input, the process 400 proceeds to a block 460. In response to the deactivation of the driver-assist feature or to the driver-assist feature already being inactive without an activation input, the process 400 proceeds to a decision block 475.

In the block 460, the computer 105 operates the driver-assist feature according to the parameters, as described above.

Next, in a decision block 465, the computer 105 determines whether the vehicle 100 is approaching a turn 215 in the route 200, e.g., is within the parameter of time before a turn 215 to begin slowing, as described above. In response to approaching a turn 215 in the route 200 while the driver-assist feature including adaptive cruise control is active, the process 400 proceeds to a block 470. Otherwise, the process 400 proceeds to the decision block 475.

In the block 470, the computer 105 slows the vehicle 100 below the target speed of the adaptive cruise control to the target turn speed, as described above. After the block 470, the process 400 proceeds to the decision block 475.

In the decision block 475, the computer 105 determines whether the vehicle 100 is at the destination 300, e.g., a location of the vehicle 100 matches the location of the destination 300, or the propulsion system 115 has been put into park, or the vehicle 100 has been turned off. If the vehicle 100 is not at the destination 300, the process 400 returns to the decision block 405 for the vehicle 100 to continue traveling to the destination 300. If the vehicle 100 is at the destination 300, the process 400 proceeds to a block 480.

In the block 480, the computer 105 tracks the usage count of the vehicle 100 following the route 200 to the destination 300 for the conditions, if any, identified in the block 415, as described above.

Next, in a decision block 485, the computer 105 determines whether the usage count incremented in the block 480 exceeds a threshold, as described above. If so, the process 400 proceeds to a block 490. If not, the process 400 ends.

In the block 490, the computer 105 outputs a prompt to an operator to save the route 200 to memory, and if the computer 105 receives an input to save the route 200, saves the route 200 to memory, as described above. After the block 490, the process 400 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
   receive an input indicating a destination;
   determine a first route for a vehicle from a current location of the vehicle to the destination;
   activate a navigation feature to output guidance instructing an operator to follow the first route;
   track a usage count of the vehicle following the first route to the destination;
   in response to the navigation feature being active for the first route, prompt the operator to activate a driver-assist feature of the vehicle; and
   in response to receiving an input to activate the driver-assist feature, actuate the vehicle according to the driver-assist feature;
   wherein prompting the operator to activate the driver-assist feature is conditional on a criterion being satisfied;
   the criterion includes that the usage count weighted by a gain exceeds a threshold;
   the gain depends on previous usage of the driver-assist feature by the operator; and
   the criterion is based on previously deviating onto the first route while the navigation feature was active for a second route.

2. The computer of claim 1, wherein the driver-assist feature includes an adaptive cruise control.

3. The computer of claim 1, wherein the instructions further include instructions to receive data indicating a condition affecting the vehicle, and the usage count is a number of times the vehicle followed the first route when the condition affected the vehicle.

4. The computer of claim 1, wherein the instructions further include instructions to receive data indicating a condition affecting the vehicle, and determining the first route is based on the condition, the first route being different than an alternative route that would be determined if the condition were not present.

5. The computer of claim 4, wherein the condition is that the vehicle is carrying a load.

6. The computer of claim 4, wherein the condition is a weather condition.

7. The computer of claim 1, wherein the instructions further include instructions to, in response to the usage count exceeding a second threshold, output a prompt to the operator to save the first route to memory.

8. The computer of claim 7, wherein determining the first route includes to select the first route from a plurality of saved routes in memory, the first route being different than an alternative route that would be determined if the first route were not saved to memory.

9. The computer of claim 8, wherein the instructions further include instructions to receive data indicating a condition affecting the vehicle, the first route is associated with the condition, and determining the first route is based on the condition being present.

10. The computer of claim 7, wherein the destination is a first destination, and determining the first route includes to select a third route from a plurality of saved routes in memory, the third route being to a second destination that is between the current location and the first destination, the first route being different than an alternative route that would be determined if the third route were not saved to memory.

11. The computer of claim 1, wherein the instructions further include instructions to, in response to a second input, save a third route along which the vehicle travels to memory.

12. The computer of claim 1, wherein the instructions further include instructions to, while the navigation feature is active, in response to approaching a turn in the first route while the driver-assist feature is active, slow the vehicle below a target speed of the driver-assist feature.

13. The computer of claim 12, wherein the target speed is a posted speed limit.

14. A method comprising:
   receiving an input indicating a destination;
   determining a first route for a vehicle from a current location of the vehicle to the destination;
   activating a navigation feature to output guidance instructing an operator to follow the first route;
   tracking a usage count of the vehicle following the first route to the destination;
   in response to the navigation feature being active for the first route, prompting the operator to activate a driver-assist feature of the vehicle; and
   in response to receiving an input to activate the driver-assist feature, actuating the vehicle according to the driver-assist feature;
   wherein prompting the operator to activate the driver-assist feature is conditional on a criterion being satisfied;
   the criterion includes that the usage count weighted by a gain exceeds a threshold;
   the gain depends on previous usage of the driver-assist feature; and
   the criterion is based on previously deviating onto the first route while the navigation feature was active for a second route.

* * * * *